(12) United States Patent
Wang et al.

(10) Patent No.: US 11,681,444 B2
(45) Date of Patent: Jun. 20, 2023

(54) SHINGLED MAGNETIC DISK MANAGEMENT METHOD FOR DATA ISOLATION BY SPACE FILES, APPARATUS, AND ELECTRONIC DEVICE

(71) Applicant: Beijing Baidu Netcom Science Technology Co., Ltd., Beijing (CN)

(72) Inventors: Chao Wang, Beijing (CN); Jian Liu, Beijing (CN); Li Li, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 279 days.

(21) Appl. No.: 17/020,967

(22) Filed: Sep. 15, 2020

(65) Prior Publication Data
US 2021/0191616 A1 Jun. 24, 2021

(30) Foreign Application Priority Data
Mar. 30, 2020 (CN) .......................... 202010237573.1

(51) Int. Cl.
G06F 3/06 (2006.01)

(52) U.S. Cl.
CPC ............ *G06F 3/062* (2013.01); *G06F 3/0643* (2013.01); *G06F 3/0644* (2013.01); *G06F 3/0676* (2013.01)

(58) Field of Classification Search
CPC ....... G06F 3/0643–0644; G06F 3/0676; G06F 2009/45587; G06F 2009/45583;
(Continued)

(56) References Cited

U.S. PATENT DOCUMENTS 9,104,339 B1 * 8/2015 Kalekar ................ G06F 3/0644
9,324,367 B1 * 4/2016 Ku .......................... G11B 5/012
(Continued)

FOREIGN PATENT DOCUMENTS

CN 101567003 A 10/2009
CN 104461390 A 3/2015
(Continued)

OTHER PUBLICATIONS

He, Weiping, and David HC Du. "{SMaRT}: An Approach to Shingled Magnetic Recording Translation." 15th USENIX Conference on File and Storage Technologies (FAST 17). 2017. (Year: 2017).*
(Continued)

*Primary Examiner* — Charles Rones
*Assistant Examiner* — Hewy H Li
(74) *Attorney, Agent, or Firm* — Dilworth IP, LLC (57) ABSTRACT

The present application discloses a magnetic disk management method, an apparatus and an electronic device by providing an engine layer including a plurality of space files and an encapsulation layer including a file directory tree of a space file structure; where the engine layer responds to a data management operation performed for a target space file of the file directory tree output by the engine layer, and a target magnetic disk space corresponding to the target space files is determined through the address association list of the encapsulation layer, and data management is performed on the data in the target magnetic disk space. Thereby, different data can be isolated by different space files when entering through the engine layer, which ensures that security issues such as leakage of the data in the magnetic disk will not occur.

20 Claims, 5 Drawing Sheets

(58) Field of Classification Search
CPC .......... G06F 3/064; G06F 2009/45579; G06F 3/0604; G06F 3/062–0623; G06F 3/0673–0679
See application file for complete search history.

(56) References Cited

U.S. PATENT DOCUMENTS

| | | | | |
|---|---|---|---|---|
| 10,645,164 | B1* | 5/2020 | Malwankar | G06F 3/0653 |
| 2002/0095557 | A1* | 7/2002 | Constable | G06F 3/0614 |
| | | | | 711/163 |
| 2004/0054746 | A1 | 3/2004 | Shibata | |
| 2005/0022024 | A1* | 1/2005 | Hashimoto | G06F 3/0611 |
| | | | | 709/225 |
| 2008/0074689 | A1 | 3/2008 | Yamada et al. | |

FOREIGN PATENT DOCUMENTS

| | | |
|---|---|---|
| CN | 104636266 A | 5/2015 |
| CN | 105677243 A | 6/2016 |
| CN | 106201355 A | 12/2016 |
| CN | 107123743 A | 9/2017 |
| CN | 107735774 A | 2/2018 |
| CN | 109491589 A | 3/2019 |
| CN | 109753224 A | 5/2019 |
| CN | 110663019 A | 1/2020 |
| CN | 110931057 A | 3/2020 |
| JP | 2004102334 A | 4/2004 |
| JP | 2008083754 A | 4/2008 |
| JP | 2010102738 A | 5/2010 |
| JP | 2010165206 A | 7/2010 |
| JP | 2015135712 A | 7/2015 |
| JP | 2018036940 A | 3/2018 |
| JP | 2019212175 A | 12/2019 |
| JP | 2020506462 A | 2/2020 |

OTHER PUBLICATIONS

Ranjanal. "Virtual Hard disk (VHD) Architecture explained". Published Mar. 23, 2010. <http://web.archive.org/web/20121015004126/http://blogs.technet.com/b/ranjanajain/archive/2010/03/23/virtual-hard-disk-vhd-architecture-explained.aspx>. . . (Year: 2010).*

Nieh, Jason, and OzgurCan Leonard. "Examining vmware." Dr. Dobb's Journal 25.8 (2000): 70 . . . (Year: 2000).*

Xiang, G., GearDB: A GC-free Key-Value Store on HM-SMR Drives with Gear Compaction, pp. 1-21.

Notice of Allowance in JP Patent Application No. 2021-055913 dated May 12, 2022.

Ren, Kai et al., IndexFS: Scaling File System Metadata Performance with Stateless Caching and Bulk Insertion, IEEE Computer Society, 2014, pp. 237-248.

European Search Report in EP Application No. 21154492.9 dated Jul. 14, 2021.

Corglin, Tom, Storage Options for digital cinema equipment, Advanced Motion Picture Technology, 2015, pp. 31.35.

First Office Action in CN Patent Application No. 202010237573.1 dated Jan. 20, 2023.

* cited by examiner

SHINGLED MAGNETIC DISK MANAGEMENT METHOD FOR DATA ISOLATION BY SPACE FILES, APPARATUS, AND ELECTRONIC DEVICE

CROSS-REFERENCE TO RELATED APPLICATION

This application claims priority to Chinese Patent Application No. 202010237573.1, filed on Mar. 30, 2020, the disclosure of which is hereby incorporated by reference in its entirety.

TECHNICAL FIELD

The present application relates to the field of computer technologies and, in particular, to a cloud computing technology.

BACKGROUND

With the rapid development of the Internet, cloud computing is gradually being promoted, accompanied by a surge in data volume.

In order to increase data storage volume and ensure the smooth progress of the cloud computing, a distributed storage system of a shingled recording hard disk came into being, which enables an effective improvement in track density and storage density per unit area through overlapping tracks. In the prior art, in order to facilitate the management of the distributed storage system of the shingled recording hard disk, an upper interface layer is utilized to perform interaction between the magnetic disk and the outside.

Although there are multiple independent magnetic disk spaces in magnetic disk in the distributed storage system of the shingled recording hard disk, and each magnetic disk space may store data independently, when a large amount of data is acquired through the upper interface layer, there is no isolation between data, which will lead to security issues such as data leakage.

SUMMARY

Embodiments of the present application provide a magnetic disk management method, an apparatus and an electronic device, which solve the problem in the prior art that, when a magnetic disk performs data interaction with the outside, data is not isolated at an interface layer, leading to data leakage easily.

A first aspect of embodiments of the present application provides a magnetic disk management method, the magnetic disk management method is applicable to a distributed storage architecture based on a shingled magnetic disk, the distributed storage architecture of the shingled magnetic disk includes: an engine layer, an encapsulation layer and a magnetic disk layer;

where the engine layer stores a plurality of space files, and each space file is relatively independent; the encapsulation layer stores a file directory tree for representing a space file structure; and the magnetic disk layer includes a plurality of magnetic disk spaces;

the magnetic disk management method includes:

responding to a data management operation performed for a target space file of the file directory tree output by the engine layer, and determining a file address of the target space file through space file index items in the engine layer;

transparently transmitting, through the engine layer, the data management operation and the file address of the target space file to the encapsulation layer;

determining a space address of a target magnetic disk space corresponding to the file address of the target space file through an address association list in the encapsulation layer; where the address association list includes an address corresponding relationship between each space file and a corresponding magnetic disk space thereof;

performing data management on data in the target magnetic disk space through the space address of the target magnetic disk space determined by the encapsulation layer.

A second aspect of embodiments of the present application provides an magnetic disk management apparatus, the magnetic disk management apparatus is applicable to a distributed storage architecture of a shingled magnetic disk, and includes: an engine layer, an encapsulation layer and a magnetic disk layer; where the engine layer stores a plurality of space files, where each space file is relatively independent; the encapsulation layer stores a file directory tree for representing a space file structure; and the magnetic disk layer includes a plurality of magnetic disk spaces;

the engine layer is configured to respond to a data management operation performed for a target space file of the file directory tree displayed by the engine layer, and determine a file address of the target space file using space file index items in the engine layer; and further configured to transparently transmit the data management operation and the file address of the target space file to the encapsulation layer; and the encapsulation layer is configured to: determine a space address of a target magnetic disk space corresponding to the file address of the target space file according to an address association list; where the address association list includes an address corresponding relationship between each space file and a corresponding magnetic disk space thereof, and perform data management on data in the target magnetic disk space according to the space address of the target magnetic disk space.

For the magnetic disk management apparatus provided by the above embodiment of the present application, data can be isolated by different space files when entering through the engine layer, which ensures that security issues such as leakage of the data in the magnetic disk will not occur.

A third aspect of embodiments of the present application provides an electronic device, including: at least one processor; and a memory communicatively connected to the at least one processor; where the memory stores instructions executable by the at least one processor, the instructions being executed by the at least one processor to enable the at least one processor to execute the method according to any one of the first aspect.

A fourth aspect of embodiments of the present application provides a computer program, including program code, when a computer runs the computer program, the program code executes the method according to any one of the first aspect.

In the embodiments of the present application, on the basis of the original magnetic disk layer, the engine layer including a plurality of space files and the encapsulation layer including the file directory tree with the space file structure are also provided; where the file directory tree can be output and the data management operation can be performed for a certain space file in the file directory tree through the engine layer; after the data management operation is transparently transmitted to the encapsulation layer, the corresponding data management is performed for the magnetic disk space corresponding to this space file through the address association list of the encapsulation layer. In this way, different data can be isolated by different space files when entering through the engine layer, which ensures that security issues such as leakage of the data in the magnetic disk will not occur.

It should be understood that the content described in this section is not intended to identify key or important features of embodiments of the present disclosure, nor is it intended to limit the scope of the present disclosure. Other features of the present disclosure will become apparent from the following description.

BRIEF DESCRIPTION OF DRAWINGS

The attached drawings are used for a better understanding of the solutions and do not constitute a limitation of the present application. Among them.

DESCRIPTION OF EMBODIMENTS

Exemplary embodiments of the present application will be illustrated in combination with the accompanying drawings in the following, which include various details of the embodiments of the present application to facilitate understanding, and they should be considered as merely exemplary. Therefore, those of ordinary skill in the art should recognize that various changes and modifications can be made to the embodiments described herein without departing from the scope and spirit of the present application. Also, for clarity and conciseness, description of well-known functions and structures are omitted in the following description.

In order to clearly understand the technical solutions of the present application, the solution of the prior art is firstly introduced in detail.

With the rapid development of the Internet, cloud computing is gradually being promoted, accompanied by a surge in data volume. In order to increase data storage volume and ensure the smooth progress of the cloud computing, a distributed storage system of a shingled recording hard disk came into being, which enables an effective improvement in track density and storage density per unit area through overlapping tracks. In the prior art, in order to facilitate the management of the distributed storage system of the shingled recording hard disk, an upper interface layer is utilized to perform interaction between the magnetic disk with the outside.

Figure 1:
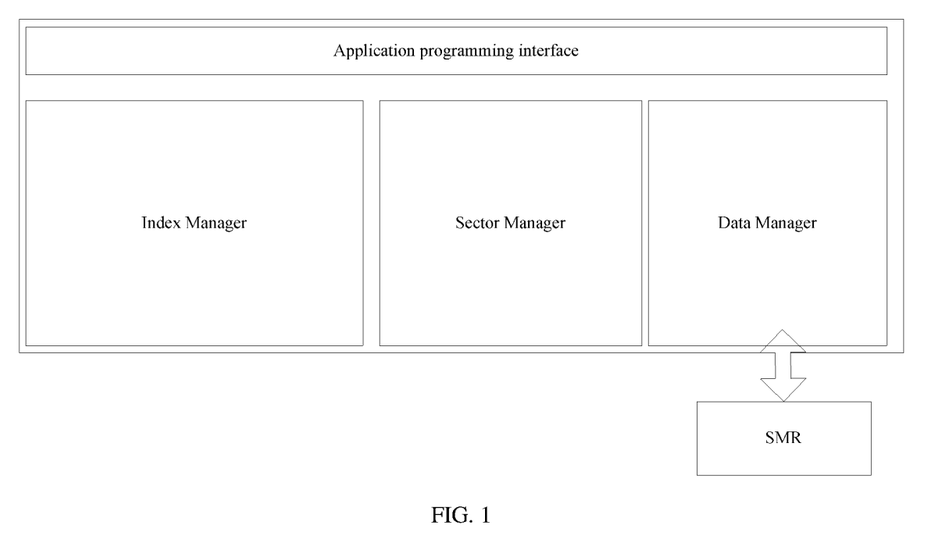
FIG. 1 is a structural schematic diagram of an existing distributed storage system of a shingled recording hard disk.

Specifically, FIG. 1 is a structural schematic diagram of an existing distributed storage system of a shingled recording hard disk. As shown in FIG. 1, an upper layer application manages data in a Shingled Magnetic Recording (SMR) disk through an API (Application Programming Interface). Internal functional modules of its structure include, for example, an Index Manager, a Sector Manager, a Data Manager. The index manager is responsible for managing index records (including incremental logs and index records in indexes), and responsible for sorting and storing the index records; the sector manager is responsible for allocating a storage space for data input by a user, where the storage space needs to be allocated in sequence for the data input by the user according to an order of storage spaces in a Zone at a bottom layer of a magnetic disk; and the data manager converts a position allocated by the sector manager into a read-write instruction through calculation and sends it to the SMR disk.

Generally, by way of division, there are a plurality of independent magnetic disk spaces at the bottom layer of the magnetic disk of the distributed storage system of the shingled recording hard disk, for storing data of different users. However, obviously, in the prior art, all the data thereof are input through the API and allocated through the sector manager to enter different magnetic disk spaces. That is to say, there is no isolation between the existing data before entering the magnetic disk spaces, which will easily lead to security issues such as data leakage.

Therefore, for the security issue of data leakage in the prior art, the inventor found in the research that, region segmentation can be directly performed at an interface layer, thereby ensuring that the data, after entering the magnetic disk, is allocated to different interface regions, and then the regions are associated with the magnetic disk spaces of the bottom layer, so as to ensure that the data is always relatively isolated in the magnetic disk without security issues such as leakage.

Based on the above inventive discovery, the inventor proposes the technical solutions of the present application. A magnetic disk management method and a magnetic disk application scenario provided by embodiments of the present application are introduced in the following.

Figure 2:
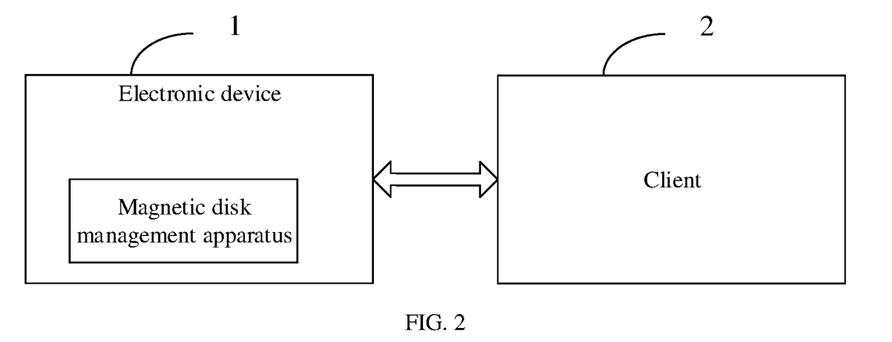
FIG. 2 is a scenario diagram of implementing a magnetic disk management method according to an embodiment of the present application.

FIG. 2 is a scenario diagram of implementing a magnetic disk management method according to an embodiment of the present application. As shown in FIG. 2, an application scenario corresponding to the magnetic disk management method according to the embodiment of the present application includes: an electronic device 1 and a client 2.

The electronic device 1 may specifically be a hardware server, or a hardware carrier bearing a cloud server. The electronic device 1 also includes a magnetic disk management apparatus applicable to a distributed storage architecture based on a shingled magnetic disk. The client 2 may interact with the electronic device 1 through a network, and initiate a data management operating request such as reading and deleting of data to the magnetic disk management apparatus in the electronic device 1 based on requirements, such that the magnetic disk management apparatus implements a response to the data management operating requests of the magnetic disk based on the magnetic disk management method.

In addition, the above-mentioned electronic device 1 may specifically be widely used in various fields, including but not limited to data storage, network magnetic disk storage of cloud computing, and the like.

It is particularly emphasized that, since the electronic device 1 provided by the present application utilizes a mode of file spaces of an engine layer, multiple data sources can be connected to, that is, different data sources may be connected to different file spaces, which realizes paths from data to the magnetic disk. In addition, the paths between different data sources are isolated, which reduces the cost of data storage (i.e., one magnetic disk may be used to store data of more data sources) and improves the utilization rate of storage space of the magnetic disk while ensuring data security.

In order to facilitate the description of the magnetic disk management method provided by the present application, firstly the distributed storage architecture based on a shingled magnetic disk on which the magnetic disk management method is based will be described.

Figure 3:
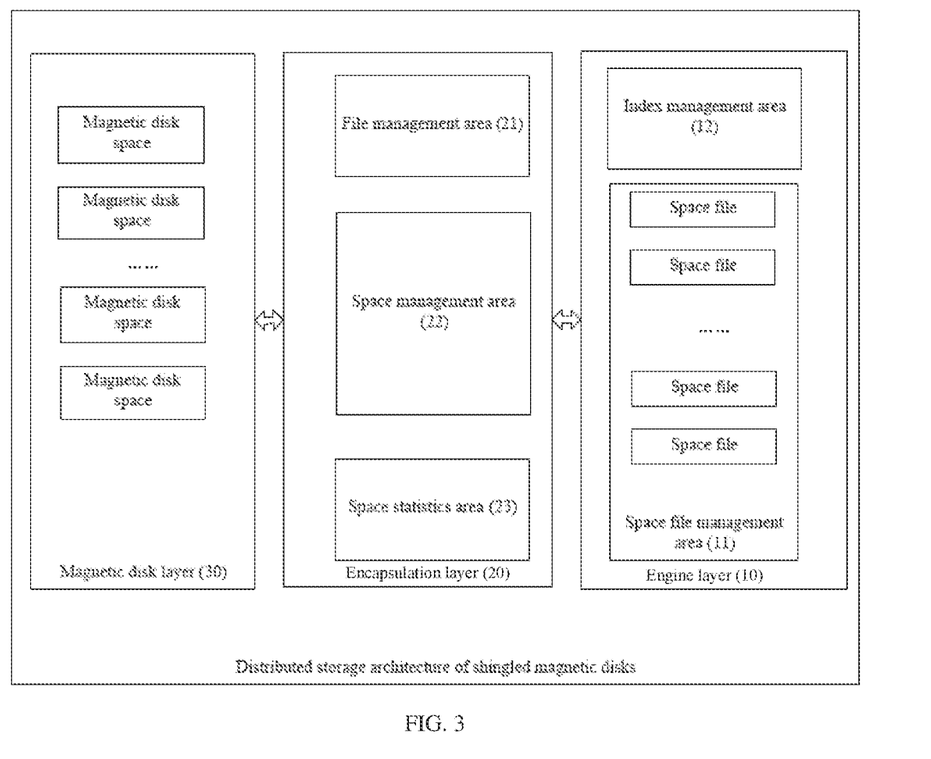
FIG. 3 is a schematic diagram of a distributed storage architecture of a shingled magnetic disk according to the present application.

FIG. 3 is a schematic diagram of a distributed storage architecture of a shingled magnetic disk according to the present application. As shown in FIG. 3, the distributed storage architecture of the shingled magnetic disk includes an engine layer 10, an encapsulation layer 20 and a magnetic disk layer 30.

The engine layer 10 includes a space file management area 11 and an index management area 12.

A plurality of space files are provided in the space file management area 11, and any two space files exist relatively independently. For each space file, a space size is fixed and consistent with a size of magnetic disk space in the magnetic disk layer, so as to reduce the complexity of the architecture and facilitate the use.

Space file index items are provided in the index management area 12, and the space file index items adopt an embedded database (e.g., a rocksdb database) to store index items of the space files, so as to record configuration information such as file address and size of each space file.

The encapsulation layer 20 includes a file management area 21, a space management area 22 and a space statistical area 23.

The file management area 21 includes a file directory tree, which is used to represent a space file structure of the space files. It can be understood that the file directory tree is a tree-like structure that describes the space files and relationships therebetween.

It should be noted that the file directory tree may be displayed through an external interface of the engine layer, such that users using this architecture can quickly know a distribution situation of the space files, and trigger space files that need to be operated based on the file directory tree. That is to say, each space file will be displayed on the file directory tree, and accordingly, when the space files are added, deleted or rewritten, the tree-like structure displayed by the file directory tree will be updated, such that the users can quickly know a latest file distribution situation, thereby facilitating the use.

The space management area 22 is configured to allocate and release authorities between the space files in the engine layer 10 and the magnetic disk spaces in the magnetic disk layer 30, so as to store an address corresponding relationship (i.e., an address association list) between a file address of each space file and a space address of the magnetic disk space corresponding to this space file.

Therefore, when a new space file is added in the engine layer 10, the space management area 22 needs to find a free magnetic disk space of the magnetic disk layer 30 for it, and records and stores a newly added address corresponding relationship after allocating a use authority of this magnetic disk space to the newly added space file; similarly, when a space file is deleted in the engine layer 10, the space management area 22 needs to release a use authority between this space file and corresponding magnetic disk space thereof, and also deletes the address corresponding relationship in the address association list. In addition, the space management area 22 is further configured to control the magnetic disk spaces in the magnetic disk layer 30 to perform data processing.

The space statistical area 23 can be configured to perform statistics on the magnetic disk space usage information of the magnetic disk layer 30, such as space sizes of the magnetic disk spaces, the number of the magnetic disk spaces, and positions of pointers in the magnetic disk space.

The magnetic disk layer 30 includes a plurality of magnetic disk spaces, which may be similar to the prior art. A magnetic disk architecture of shingled magnetic recording (SMR) disk is adopted, and the storage mode and data processing mode thereof are both similar to those of the prior art. The storage mode and data processing mode are not described in detail in the present application.

Based on the above-mentioned storage architecture, embodiments of the present application provide a magnetic disk management method and a corresponding magnetic disk management apparatus. The embodiments of the present application will be specifically described below with reference to the accompanying drawings.

Figure 4:
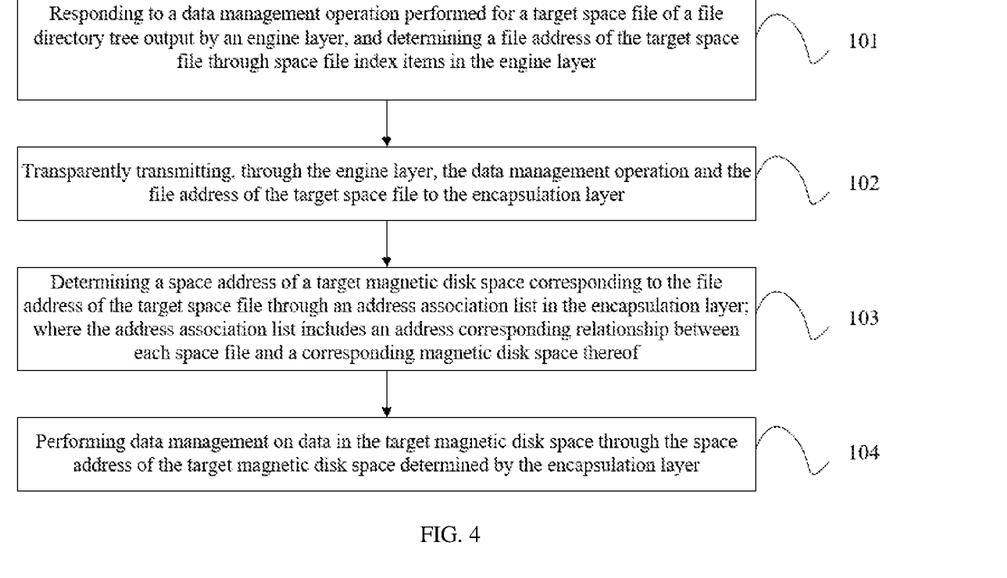
FIG. 4 is a schematic flowchart of a magnetic disk management method according to the present application.

FIG. 4 is a schematic flowchart of a magnetic disk management method according to the present application. As shown in FIG. 4, the executive entity of the embodiment of the present application is a magnetic disk management apparatus, which can be integrated into an electronic device.

The magnetic disk management method provided in this embodiment includes the following steps.

Step 101, responding to a data management operation performed for a target space file of a file directory tree output by an engine layer, and determining a file address of the target space file through space file index items in the engine layer.

Step 102, transparently transmitting, through the engine layer, the data management operation and the file address of the target space file to the encapsulation layer.

Step 103, determining a space address of a target magnetic disk space corresponding to the file address of the target space file through an address association list in the encapsulation layer; where the address association list includes an address corresponding relationship between each space file and a corresponding magnetic disk space thereof.

Step 104, performing data management on data in the target magnetic disk space through the space address of the target magnetic disk space determined by the encapsulation layer.

In the embodiment of the present application, on the basis of the original magnetic disk layer, the engine layer including a plurality of space files and the encapsulation layer including the file directory tree with the space file structure are also provided; where the file directory tree can be output and the data management operation performed for a certain space file in the file directory tree can be received through the engine layer; after the data management operation is transparently transmitted to the encapsulation layer, the corresponding data management is performed for the magnetic disk space corresponding to the space file through the address association list of the encapsulation layer. In this way, different data can be isolated by different space files when entering through the engine layer, which ensures that security issues such as leakage of the data in the magnetic disk will not occur.

Figure 5:
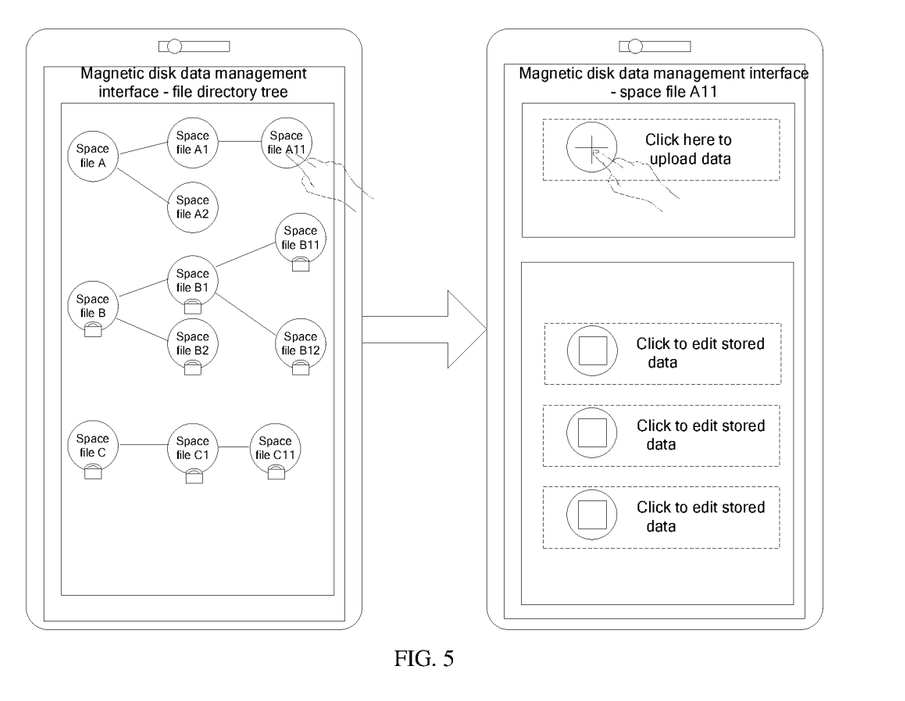
FIG. 5 is a schematic diagram of an interface interaction of a magnetic disk management method according to the present application.

Specifically, in this embodiment, the magnetic disk management apparatus can provide an interface used for interaction to external, and the interface can be used to output the aforementioned file directory tree, and can also receive various operations that are triggered by a user and perform management on data. FIG. 5 is a schematic diagram of an interface interaction of a magnetic disk management method according to the present application. As for an interactive interface, it may exist in a form of a graphic-based interactive interface (as shown in FIG. 5), or in a form of a character-based text box or code interactive box, which is not limited by the present application. In addition, for space files to which users do not have data operation authorities, the users cannot perform data management operations for the space files (which can be represented by, for example, a lock-type identifier as shown in FIG. 5).

As for the data management operation received in step 101, the operation is generally directional, that is, the data management operation is generally carried out for a certain target space file in the file directory tree. In addition, for the data management operation, it includes not only an operation target (i. e., a target space file), but also should include specific contents of the operation, such as data reading and storing, data migrating and data deleting.

When the engine layer receives and responds to the data management operation, an address of the operation target of the data management operation, that is, a file address of the target space file, will be firstly determined using the space file index items.

Specifically, as shown in FIG. 3, the file address will be stored in a space file index items of the index management area 12. Particularly, as mentioned foregoing, the space file index items are stored in a form of an embedded database of Rocksdb, and the Rocksdb database is an existing storage solution, which is more efficient for accessing fast memory and high-load server, and ensures that the space file index items can be read and written at a high speed.

In other implementations, before the engine layer responds to the data management operation, it is also necessary to confirm whether a user who initiates this data management operation has an operation authority to operate the target space file. The specific confirmation manner of the operation authority may be based on existing authority management technologies such as secret key technology and digital visa technology, which is not limited by the present application. By confirming for the operation authority, the data security of the data in the magnetic disk can be further ensured.

In this embodiment, the electronic device communicates with the client (as shown in FIG. 2), acquires a request for data management operation sent by the client, and responds to the data management operation accordingly. The magnetic disk management apparatus can communicate with the client through the electronic device on which the magnetic disk management apparatus is based, and the communication mode may be global system of mobile communication (GSM), code division multiple access (CDMA), wideband code division multiple access (WCDMA), time division-synchronous code division multiple access (TD-SCDMA), long term evolution (LTE) system and future 5G, and the like. It can be understood that the communication mode between the magnetic disk management apparatus (the electronic device) and the client may also be wireless communication mode, and the wireless communication mode may be ZigBee communication, Bluetooth BLE communication or mobile hotspot wifi communication, or the like.

Then, as described in step 102, after determining the file address of the target space file, the engine layer 10 also transparently transmits the file address and the data management operation together to the encapsulation layer 20, specifically to the space management area 22 of the encapsulation layer 20. Subsequently, as shown in step 103 and FIG. 3, the corresponding relationship between the space file and the magnetic disk space is stored in the space management area 22, and the corresponding relationship means that various operations triggered for a certain space file all act on the data stored in the corresponding magnetic disk space or on the magnetic disk space itself through the encapsulation layer 20, and the space management area 22 stores the address association list that can represent the corresponding relationship. In the address association list, the file address of each space file and the address of the corresponding magnetic disk space thereof will be associated and stored, such that after the engine layer 10 determines the file address of the target space file, the encapsulation layer 20 can determine the space address of the target magnetic disk space corresponding to the target space file through the address association list.

Finally, as described in step 104, after the encapsulation layer 20 obtains the space address of the target magnetic disk space in the magnetic disk layer 30, the space management area 22 will use the space address to perform data management on the target magnetic disk space.

In an embodiment, in order to facilitate data management and simplify the logical complexity of the architecture, the capacity of the space file can be consistent with the capacity of the magnetic disk space.

In an embodiment, the data management operation may include data reading and storing, data migrating and data deleting. Specifically, for each data management operation, the space management area 22 can call a corresponding execution function when performing data management on the target magnetic disk space.

For example, a function "pread" may be used to read data, and a function "pwrite" may be used to write data. Of course, functions of other types or other language architectures may also be used for data management, which is not limited in the present application.

In the embodiment of the present application, on the basis of the original magnetic disk layer, the engine layer including a plurality of space files and the encapsulation layer including the file directory tree with the space file structure are also provided; where the engine layer can respond to the data management operation performed for the target space file of the file directory tree displayed by the engine layer, and the encapsulation layer will determine the target magnetic disk space corresponding to the target space file in the address association list according to the data management operation, and perform data management on data in the target magnetic disk space. Therefore, the data can be isolated by different space files when entering through the engine layer, which ensures that security issues such as leakage of the data in the magnetic disk will not occur.

In order to meet actual use requirements of the magnetic disk and ensure the safety of data, it is necessary to ensure that data management can be performed on different data through different space files, and the management of the space files is also an indispensable and important link.

Figure 6:
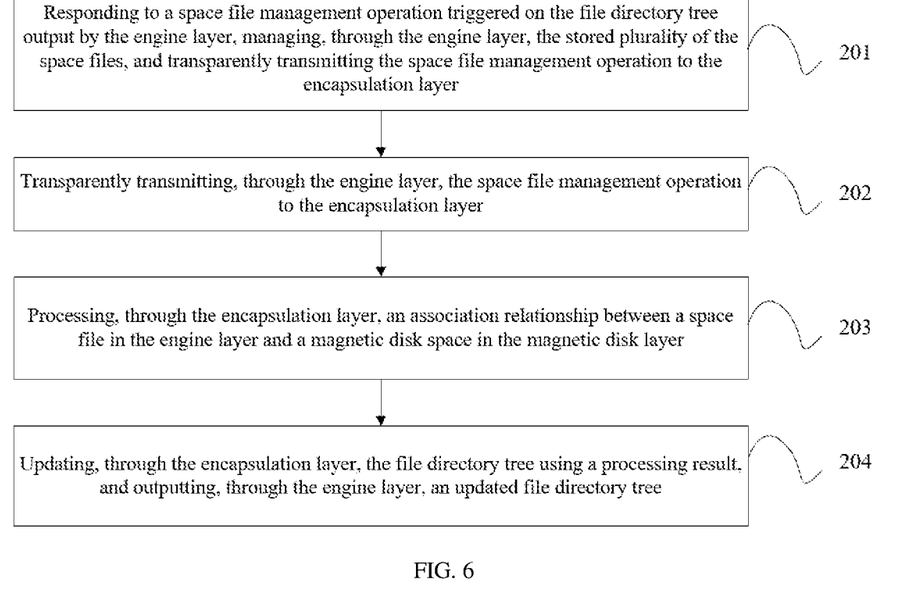
FIG. 6 is a schematic flowchart of another magnetic disk management method according to the present application.

On the basis of the foregoing embodiments, FIG. 6 is a schematic flowchart of another magnetic disk management method according to the present application. As shown in FIG. 6, on the basis of the magnetic disk management method provided by the foregoing embodiment, the magnetic disk management process also includes steps of space file management operation for managing the space files.

Specifically, on the basis of the aforementioned steps 101-103, the magnetic disk management method provided by this embodiment further includes the following steps.

Step 201, responding to a space file management operation triggered on the file directory tree output by the engine layer, managing, through the engine layer, the stored plurality of the space files, and transparently transmitting the space file management operation to the encapsulation layer.

Step 202, transparently transmitting, through the engine layer, the space file management operation to the encapsulation layer.

Step 203, processing, through the encapsulation layer, an association relationship between a space file in the engine layer and a magnetic disk space in the magnetic disk layer.

Step 204, updating, through the encapsulation layer, the file directory tree using a processing result, and outputting, through the engine layer, an updated file directory tree.

It should be noted that the architecture shown in FIG. 3 can be adopted in this implementation, and the related embodiment on which steps 201-204 are based thereof is a further extension of the foregoing embodiments, that is, steps 101-104 may be executed on the basis of executing steps 201-204.

Specifically, as shown in FIG. 3, the file management area 21 of the encapsulation layer 20 includes the file directory tree for representing the space file structure of space files. It can be understood that the file directory tree is a tree-like structure that describes the space files and relationships therebetween.

Therefore, in this embodiment, in order to keep the displayed file directory tree be consistent with the structure of the space files in the actual engine layer 10, this embodiment also needs to perform corresponding update processing on the file directory tree, to facilitate viewing and acquiring by users.

The processing steps involved in this embodiment will be illustrated in the following.

Firstly, similar to the foregoing embodiments, in this embodiment, the magnetic disk management apparatus may also receive a space file management operation that is triggered by the user and performed for the space files in the file directory tree on an interface (used for interaction) provided to the external.

For the received space file management operations, there may be many different types of space file management operations, for example, creating, deleting, rewriting of the space files, and the like. Slightly different from data management operations, the space file management operations may have directivity (such as deleting and rewriting) or may not have directivity (such as creating).

In addition, when receiving and responding to the space file management operation, the engine layer 10 will execute different processing modes based on different space file management operations.

For an operation having directivity (such as deleting and rewriting), an address of an operation target of the space file management operation, that is, a file address of the target space file, may be determined using the space file index item. Then a corresponding operation function is called, to perform corresponding management thereon. For an operation having no directivity (such as creating), the corresponding operation function can be directly called to perform corresponding management thereon.

It should be noted that for the related descriptions of the above-mentioned space file index items, the foregoing embodiments can be referred to, which will not be described in detail here. In addition, before the engine layer responds to the space file management operation, it is also necessary to confirm whether a user who initiates a space file management operation has an operation authority to manage the space file that he/she wants to manage. The specific confirmation mode of the operation authority may be based on the existing authority management technologies such as secret key technology, digital visa technology, which is not limited by the present application. By confirming the operation authority, the data security of the data in the magnetic disk can be further ensured.

Then, after completing the management operation of the space files, the engine layer 10 will also transparently transmit the space file management operation to the file management area 21 and the space management area 22 in the encapsulation layer 20.

As described in the foregoing embodiments, the space management area 22 can be configured to manage the corresponding relationships between the space files and the magnetic disk spaces (i.e., bind or release the corresponding relationships). Therefore, after receiving the space file management operation, the space management area 22 will process the association relationships between the space files and the magnetic disk space based on the operation type. The processing thereof includes, but is not limited to, updating the address association list, binding or releasing the corresponding relationship between a certain space file and a magnetic disk space.

The file management area 21 includes the file directory tree. Since the file directory tree records the structure of space files in the engine layer 10, the file management area 21 will update the file directory tree after the space management area 22 completes processing of the association relationship, such that the updated file directory tree may be displayed in the engine layer 10, thus ensuring the real-time nature when the file directory tree displays results of the space file management operations.

Of course, for different types of space file management operations, processing flow thereof will be different. The above-mentioned magnetic disk management method will be further illustrated by taking a space file creating operation, a space file deleting operation and a space file rewriting operation as examples in the following.

Space File Creating Operation

In order to make the management of the space files more convenient and improve the flexibility of structure thereof, when the existing space files are all occupied, it is necessary to create a new space file for newly stored data, so as to ensure the security of the data. Therefore, when the space file management operation is specifically an operation that may be used to create a space file, step 201 may specifically include:

step 2011, creating a new space file through the engine layer.

Accordingly, step 203 may specifically include:

step 2031, determining, through the encapsulation layer, any free magnetic disk space in the magnetic disk layer, and associating and storing a space address of the new space file and a space address of the free magnetic disk space in the address association list, such that data written into the new space file is stored in the free magnetic disk space corresponding to the new space file through the address association list; where the address association list includes the address corresponding relationship between each space file and the corresponding magnetic disk space thereof.

Specifically, when the user needs to store data, the data management operation for writing data may be sent to the engine layer 10 of the magnetic disk. At this time, the engine layer 10 and the encapsulation layer 20 will determine whether there is a magnetic disk space capable of accommodating the data so as to write the data, and if not, turn to the space file creating operation described in this embodiment. Or, the user may directly initiate the space file creating operation to the engine layer 10. Regardless of the trigger mode, the space file management area 11 in the engine layer 10 will receive the space file creating operation triggered by the user at the engine layer 10 and respond to the operation.

The space file management area 11 will first create a plurality of space files according to the requirement of the space file creating operation in combination with the magnetic disk storage condition.

Due to the increase in the space files, the structure thereof will be changed. At this time, the file directory tree needs to be updated. After the engine layer 10 transparently transmits the space file creating operation to the space management area 22 of the encapsulation layer 20, the space management area 22 first finds a free magnetic disk space in the magnetic disk layer 30, that is, a magnetic disk space that is not bound to any space file, and then associates and stores the file address of the created new space file and the space address of the free magnetic disk space to update the address association list stored therein.

In addition, the file directory tree may also be updated, that is, in an embodiment, step 204 may specifically include:

step 2041, adding, through the encapsulation layer, a file identifier of the new space file into the file directory tree to obtain the updated file directory tree, and outputting, through the engine layer, the updated file directory tree.

Specifically, the engine layer 10 also transparently transmits the space file creating operation to the file management area 21 of the encapsulation layer 20. The file management area 21 will update the file directory tree based on the space file creating operation in combination with an updated result of the address association list in step 2021. A file identifier of the new space file created this time will be added to the updated file directory tree, and the updated file directory tree will be displayed through the engine layer 10 for the user to acquire.

Space File Deleting Operation

In order to make the management of the space files more convenient and improve the flexibility of structure thereof, when the existing space files are rewritten (rewriting will release some space files), for the engine layer, it is necessary to delete useless space files or free space files, to ensure the effective use of storage resources. When the space file management operation is specifically an operation that can be used to delete a space file, step 201 may specifically include:

step 2012, deleting, through the engine layer, a space file to be deleted that is selected by the space file deleting operation.

Accordingly, step 203 may specifically include:

step 2032, determining a magnetic disk space to be deleted corresponding to the space file to be deleted through the address association list in the encapsulation layer, deleting data in the magnetic disk space to be deleted, and releasing an address corresponding relationship between the magnetic disk space to be deleted and the space file to be deleted in the address association list; where the address association list includes the address corresponding relationship between each space file and the corresponding magnetic disk space thereof.

Specifically, when the user needs to store, delete or migrate data etc., the data management operation for deleting or migrating data may be sent to the engine layer 10 of the magnetic disk. At this time, the engine layer 10 and the encapsulation layer 20 will determine whether to perform a deleting operation on the space files after performing data deletion or data migration. Or, the user may directly initiate the space file deleting operation for the engine layer 10. Regardless of the trigger mode, the space file management area 11 in the engine layer 10 will receive the space file deleting operation triggered by the user at the engine layer 10 and respond to the operation.

The space file management area 11 first determines a space file to be deleted according to the space file deleting operation, and then deletes the space file to be deleted in the space file management area 11 of the engine layer 10. In addition, the deleting operation will also involve deleting data in a magnetic disk space to be deleted corresponding to the space file to be deleted. After both the space file to be deleted and the data in the magnetic disk space to be deleted are deleted, the space management area 22 of the encapsulation layer 20 will release a binding relationship between the space file to be deleted and the magnetic disk space to be deleted, and delete or release a address corresponding relationship in the address association list thereof.

In addition, the file directory tree may also be updated, that is, in an embodiment, step 204 may specifically include:

step 2042, deleting, through the encapsulation layer in the file directory tree, a file identifier of the space file to be deleted that is selected by the space file deleting operation to obtain the updated file directory tree, and outputting, through the engine layer, the updated file directory tree.

Specifically, the engine layer 10 also transparently transmits the space file deleting operation to the file management area 21 of the encapsulation layer 20. The file management area 21 will update the file directory tree based on the space file deleting operation in combination with an updated result of the address association list in step 2021. The file identifier of the space file to be deleted this time will be deleted in the updated file directory tree, and the updated file directory tree will be displayed through the engine layer 10 for the user to acquire.

Space File Rewriting Operation

In order to make the management of the space files more convenient and improve the flexibility of the structure thereof, when the existing storage resources are insufficient, a rewriting operation can be performed on the space files to ensure a higher utilization rate of the storage resources of each space file. Therefore, when the space file management operation is specifically an operation that can be used to rewrite a space file, step 201 may specifically include:

step 2013, acquiring, through the engine layer, a hole rate and a creation time of each space file, and determining a space file to be rewritten; where the hole rate of the space file to be rewritten is greater than a hole rate threshold, and a duration corresponding to the creation time is greater than a duration threshold;

step 2014, performing, through the engine layer, rewriting processing of the space file to be rewritten.

By performing rewriting processing on the space files in the engine layer 10, the use efficiency of the space files can be effectively improved. It should be noted that, for each rewriting, only a plurality of space files belonging to the same user can be rewritten. For space files of different users, due to different data sources, rewriting of the space files of different users will not be performed in a same rewriting processing in order to ensure that the data will not be leaked.

Specifically, when receiving the space file rewriting operation, the space file management area 11 of the engine layer 10 will determine the hole rate of each space file and select a space file meeting certain conditions as the space file to be rewritten. The conditions thereof may be a hole rate threshold and a creation duration. That is to say, when the hole rate of a space file is greater than the hole rate threshold and the duration from the time of its creation to the current time is greater than a duration threshold, the space file will be regarded as the space file to be rewritten.

Then, the space file management area 11 in the engine layer 10 will perform rewriting processing on these space files to be rewritten, that is, the engine layer 10 recombines the space files to be rewritten to obtain a rewritten space file. At the same time, the engine layer 10 also needs to determine a file position of the rewritten space file, that is, a rewriting position. Subsequently, the engine layer 10 releases physical spaces of the space files to be rewritten; where the rewriting position is an end of the rewritten space file obtained by a previous rewriting processing.

Figure 7:
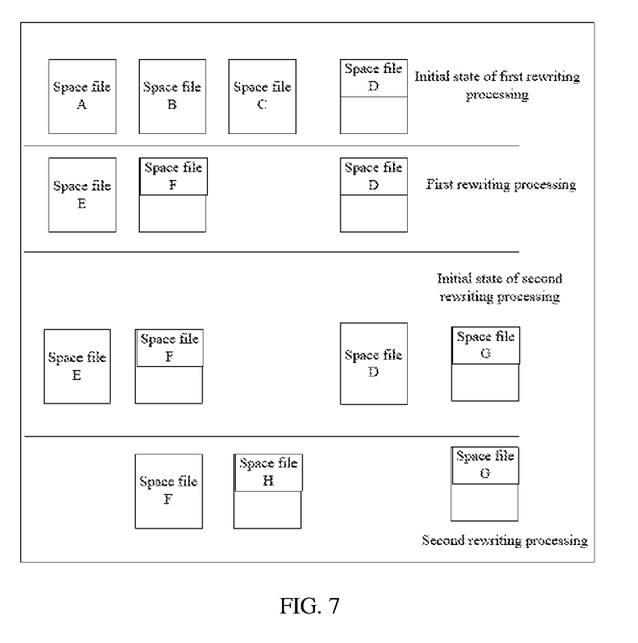
FIG. 7 is a schematic diagram of rewriting space files according to the present application.

For example, FIG. 7 is a schematic diagram of space file rewriting according to the present application. As shown in FIG. 7, it is assumed that four space files (a space file A, a space file B, a space file C and a space file D) belonging to the same user are included in an initial state, where hole rates of the four space files are all greater than a hole rate threshold; the space file D is a newly created space file, a duration corresponding to whose creation time is less than a duration threshold, and creation durations of the space file A, the space file B and the space file C are greater than or equal to the duration threshold. Based on this condition, the space files A, B and C are taken as space files to be rewritten in the rewriting at this time.

Then, the engine layer 10 will perform one rewriting processing on the space files A, B and C, so as to reallocate spaces or restore contents of the space file A, the space file B and the space file C, and obtain a rewritten space file E and a rewritten space file F. Since the rewriting at this time is the first time to rewrite, there is no rewritten space file obtained from the previous rewriting processing, that is, a rewriting position of this rewriting processing may be a head end of a new space file. At this time, hole rates of the space file E and the space file F are both greater than the hole rate threshold, and the creation durations are updated. Due to the problem of capacity, the space file F does not occupy the capacity of the whole space file, that is, only half of the file capacity of the space file F is used or occupied. At this point, one rewriting processing is completed.

FIG. 7 also shows a process of performing a second rewriting processing on the space files after the aforementioned rewriting processing. Specifically, after a period of time, the engine layer 10 includes the space file D, the space file E, the space file F and a space file G. The space file E and the space file F are obtained from the previous rewriting processing, while the space file G is newly created within this period of time.

In the second rewriting processing, it is also necessary to firstly determine a space file to be rewritten at this time. It can be assumed that, for the hole rate, the hole rates of the space file E and the space file D are both greater than the hole rate threshold as time goes by, while the hole rates of the space file F and the space file G are less than or equal to the hole rate threshold. As for the creation duration, only a creation duration of the space file G is less than the duration threshold, while the creation durations of the space file E, the space file F and the space file D are all greater than or equal to the duration threshold. At this time, the space file E and the space file D will be used as the space files to be rewritten in the second rewriting process.

The engine layer 10 will perform rewriting processing on the space file E and space file D, to finally obtain the space file F, the space file H and the space file G. The space file G is a space file existing before the second rewriting processing, while the space file F and the space file H are space files obtained after this rewriting process. As mentioned above, after the rewriting processing, it is further necessary to determine the rewriting position. Since the space file F is the last space file of the previous rewriting processing, and the capacity of the space file F is less than half, a second half of the space file F is used as the rewriting position of the second rewriting process, so as to integrate the rewritten space file into the second half of the space file F, to obtain a space file F with complete capacity, and a part that may not be accommodated by the space file F will form the new space file H.

By adopting such rewriting processing mode, the capacity of the space file can be maximized, which reduces the hole rate of the space file and effectively improves the utilization rate of the space file.

On the basis of the foregoing embodiments, the magnetic disk management method provided in this embodiment also provides a processing manner including space file management operations for managing space files, thereby realizing the management of the space file structure, improving the flexibility of the storage structure in the magnetic disk, and facilitating the use by users.

Figure 8:
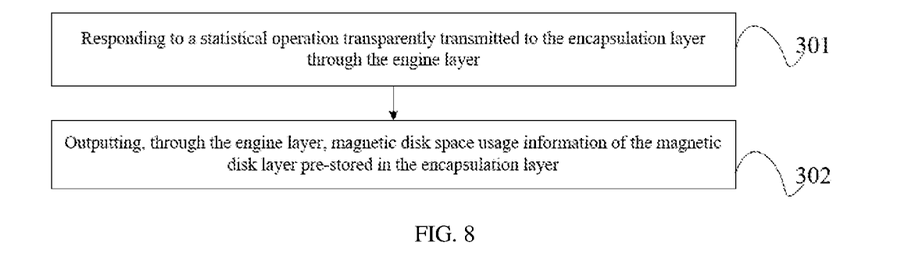
FIG. 8 is a schematic flowchart of yet another magnetic disk management method according to the present application.

In order to further help the user acquire information of the magnetic disk, so as to manage the magnetic disk, this embodiment will also provide functions of performing statistics and viewing on the magnetic disk layer. Specifically, based on the architecture shown in FIG. 3, FIG. 8 is a schematic flowchart of yet another magnetic disk management method provided by the present application. As shown in FIG. 8, the magnetic disk management method provided in this embodiment also includes the function of performing statistics and viewing on the magnetic disk layer based on the magnetic disk management method provided in the above embodiments of the present application.

Specifically, on the basis of the aforementioned steps 101-104 or steps 201-204, the magnetic disk management method provided by this embodiment further includes the following steps:

step 301, responding to a statistical operation transparently transmitted to the encapsulation layer through the engine layer; and step 302, outputting, through the engine layer, magnetic disk space usage information of the magnetic disk layer pre-stored in the encapsulation layer.

In this embodiment, data management and/or space file management may also be performed based on the foregoing embodiments. However, in this embodiment, viewing and statistics may also be performed by the space statistical area 23 in the encapsulation layer 20 for relevant information of the magnetic disk layer 30.

The processing steps involved in this embodiment will be illustrated in the following.

Firstly, similar to the foregoing embodiments, in this embodiment, the magnetic disk may also receive a statistical operation performed on the magnetic disk space of the magnetic disk layer 30 triggered by the user on an interface (used for interaction) provided to the external.

After receiving the statistical operation, the engine layer 10 will also transparently transmit the statistical operation to the space statistical area 23 of the encapsulation layer 20. As shown in FIG. 3, the encapsulation layer 20 is provided with a space statistical area 23, which may be configured to perform statistics on the magnetic disk space usage information of the magnetic disk layer 30, such as a free magnetic disk space list, a magnetic disk capacity of a free magnetic disk space, and a total capacity of magnetic disk spaces in the magnetic disk layer.

After the statistics is completed, these usage information of the magnetic disk space will be displayed through the engine layer 10.

It should be noted that before the engine layer responds to the statistical operation, it is also necessary to confirm whether a user who initiates the space statistical operation has an operation authority to perform statistics and viewing on the magnetic disk space thereof. The specific confirmation mode of the operation authority may be based on existing authority management technologies such as secret key technology, digital visa technology, which is not limited by the present application. By confirming for the operation authority, the data security of the data in the magnetic disk can be further ensured.

On the basis of the foregoing embodiments, the magnetic disk management method provided in this embodiment also provides a statistical viewing mode for the magnetic disk space usage information, thus helping the user view the usage of the magnetic disk and use it.

Figure 9:
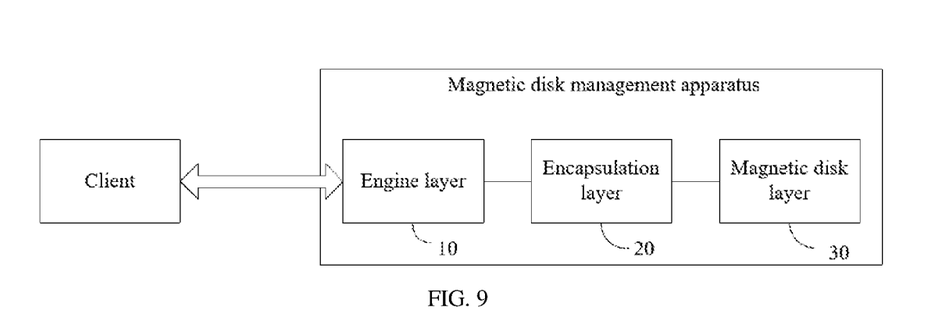
FIG. 9 is a schematic structural diagram of a magnetic disk management apparatus according to the present application.

FIG. 9 is a structural schematic diagram of a magnetic disk management apparatus provided by the present application, the magnetic disk management apparatus being applicable to a distributed storage architecture of a shingled magnetic disk. As shown in FIG. 9, the magnetic disk management apparatus provided in this embodiment includes: an engine layer 10, an encapsulation layer 20 and a magnetic disk layer 30.

The engine layer 10 stores a plurality of space files, where each space file is relatively independent, the encapsulation layer 20 stores a file directory tree for representing a space file structure; and the magnetic disk layer 30 includes a plurality of magnetic disk spaces;

the engine layer 10 is configured to respond to a data management operation performed for a target space file of the file directory tree displayed by the engine layer 10, and determine a file address of the target space file using space file index items in the engine layer 10; and further configured to transparently transmit the data management operation and the file address of the target space file to the encapsulation layer 20; and the encapsulation layer 20 is configured to determine a space address of a target magnetic disk space corresponding to the file address of the target space file according to an address association list; where the address association list includes an address corresponding relationship between each space file and a corresponding magnetic disk space thereof, and perform data management on data in the target magnetic disk space according to the space address of the target magnetic disk space.

In an embodiment, the engine layer 10 of the magnetic disk is further configured to respond to a space file management operation triggered on the file directory tree that is displayed by the engine layer 10, and the engine layer 10 manages the plurality of space files stored thereon according to the space file management operation; and the engine layer 10 transparently transmits the space file management operation to the encapsulation layer 20, such that the encapsulation layer 20 processes an association relationship between a space file in the engine layer 10 and a magnetic disk space in the magnetic disk layer 30 according to the space file management operation.

The encapsulation layer 20 updates the file directory tree according to a processing result and displays an updated file directory tree through the engine layer 10.

In an embodiment, the space file management operation is a space file creating operation; and the engine layer 10 is specifically configured to create a new space file according to the space file creating operation; and transparently transmit the space file management operation to the encapsulation layer 20.

The encapsulation layer 20 is specifically configured to determine any free magnetic disk space in the magnetic disk layer 30, and associate and store a space address of the new space file and a space address of the free magnetic disk space in the address association list, such that data written into the new space file is stored in the free magnetic disk space corresponding to the new space file through the address association list; where the address association list includes the address corresponding relationship between each space file and the corresponding magnetic disk space thereof.

In an embodiment, the encapsulation layer 20 is specifically configured to add a file identifier of the new space file to the file directory tree to obtain the updated file directory tree, and display the updated file directory tree through the engine layer 10.

In an embodiment, the space file management operation is a space file deleting operation; and the engine layer 10 is specifically configured to delete a space file to be deleted that is selected by the space file deleting operation; and transparently transmit the space file management operation to the encapsulation layer 20.

The encapsulation layer 20 is specifically configured to determine a magnetic disk space to be deleted corresponding to the space file to be deleted according to the address association list, delete data in the magnetic disk space to be deleted, and release an address corresponding relationship between the magnetic disk space to be deleted and the space file to be deleted in the address association list; where the address association list includes the address corresponding relationship between each space file and the corresponding magnetic disk space thereof.

In an embodiment, the encapsulation layer 20 is specifically configured to delete a file identifier of the space file to be deleted that is selected by the space file deleting operation in the file directory tree to obtain the updated file directory tree, and display the updated file directory tree through the engine layer 10.

In an embodiment, the space file management operation is a space file rewriting operation;

the engine layer 10 specifically configured to acquire a hole rate and a creation time of each space file, and determine a space file to be rewritten; where the hole rate of the space file to be rewritten is greater than a hole rate threshold, and a duration corresponding to the creation time is greater than a duration threshold; and the engine layer 10 performs rewriting processing on the space file to be rewritten.

In an embodiment, the performing rewriting processing on the space file to be rewritten by the engine layer 10, includes:

recombining, by the engine layer 10, each space file to be rewritten to obtain a rewritten space file; and the engine layer 10 is further configured to determine a rewriting position of the rewritten space file, and release physical spaces of the space files to be rewritten; where the rewriting position is an end of a rewritten space file obtained by a previous rewriting processing.

In an embodiment, the engine layer 10 is further configured to respond to a statistical operation transparently transmitted to the encapsulation layer 20 through the engine layer 10; and the engine layer 10 displays the magnetic disk space usage information of the magnetic disk layer 30 pre-stored in the encapsulation layer 20.

In an embodiment, the magnetic disk space usage information includes a free magnetic disk space list, a magnetic disk capacity of a free magnetic disk space and a total capacity of magnetic disk spaces in the magnetic disk layer 30.

In an embodiment, a capacity of a magnetic disk space is consistent with that of a space file.

In an embodiment, the data management operation includes data reading and storing, data migrating and data deleting.

The magnetic disk management apparatus provided in this embodiment can implement the technical solutions of any of the aforementioned method embodiments, and implementation principles and technical effects thereof are similar to those of the aforementioned method embodiments, which is not repeated here.

According to an embodiment of the present application, the present application also provides an electronic device.

Figure 10:
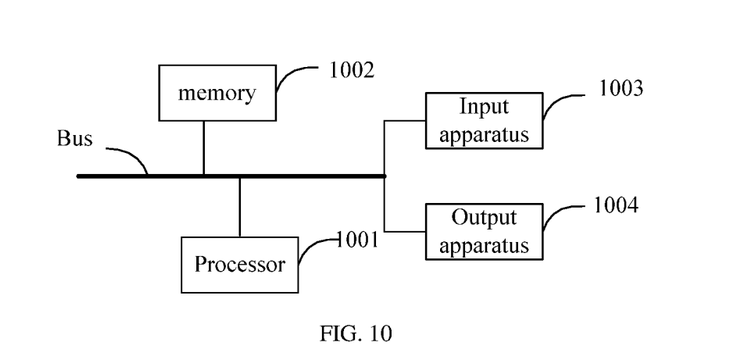
FIG. 10 is a block diagram of an electronic device for implementing the magnetic disk management method according to an embodiment of the present application.

As shown in FIG. 10, it is a block diagram of an electronic device of a magnetic disk management method according to the embodiments of the present application. The electronic device is intended to represent various forms of digital computer, such as laptop computer, desktop computer, workstation, personal digital assistant, server, blade server, mainframe computer, and other suitable computer. The electronic device may also represent various forms of mobile apparatus, such as personal digital processing, cellular phone, smartphone, wearable device and other similar computing apparatuses. The components shown herein, their connections and relationships, and their functions are merely examples, and are not intended to limit the implementations of the present application described and/or claimed herein.

As shown in FIG. 10, the electronic device includes: one or more processors 1001, a memory 1002, and interfaces for connecting various components, including high-speed interfaces and low-speed interfaces. The various components are interconnected using different buses, and can be mounted on a common motherboard or otherwise installed as required. The processor may process instructions executed within the electronic device, including instructions stored in or on the memory to display graphical information of a Graphical User Interface (GUI) on an external input/output apparatus, such as a display device coupled to an interface. In other implementations, a plurality of processors and/or a plurality of buses may be used with a plurality of memories, if desired. Similarly, a plurality of electronic devices can be connected, and each device provides part of necessary operations (for example, as a server array, a group of blade servers, or a multiprocessor system). One processor 1001 is taken as an example in FIG. 10.

The memory 1002 is a non-transitory computer-readable storage medium provided by the present application. The memory stores instructions executable by at least one processor, so that the at least one processor executes the magnetic disk management method provided by the present application. The non-transitory computer-readable storage medium of the present application stores computer instructions, the computer instructions are used to cause a computer to execute the magnetic disk management method provided by the present application.

As a non-transitory computer readable storage medium, the memory 1002 may be configured to store non-transitory software programs, non-transitory computer-executable programs and modules, such as program instructions/modules corresponding to the magnetic disk management method in the embodiments of the present application. The processor 1001 executes various functional applications and data processing of the server by running non-transitory software programs, instructions and modules stored in the memory 1002, that is, the magnetic disk management method in the above-mentioned method embodiments are realized.

The memory 1002 may include a storage program area and a storage data area, where the storage program area may store an operating system and at least one application program required for functions; the storage data area may store data created according to the use of the electronic device of FIG. 10, and the like. In addition, the memory 1002 may include high-speed random access memory, and may also include non-transitory memory, such as at least one magnetic disk memory device, flash memory device, or other non-transitory solid-state memory devices. In some embodiments, the memory 1002 may include memories remotely disposed with respect to the processor 1001, and these remote memories may be connected to the electronic device of FIG. 10 through a network. Examples of the above-mentioned network include, but are not limited to, an Internet, an intranet, a local area network, a mobile communication network and combination thereof.

The electronic device of FIG. 10 may further include an input apparatus 1003 and an output apparatus 1004. The processor 1001, the memory 1002, the input apparatus 1003, and the output apparatus 1004 may be connected through a bus or other means. In FIG. 10, a connection through a bus is taken as an example.

The input apparatus 1003 may receive input voice, numeric or character information, and generate key signal inputs related to user settings and function control of the electronic device of FIG. 10, for example input apparatus such as touch screen, keypad, mouse, track pad, touch pad, pointing stick, one or more mouse buttons, trackball, joystick. The output apparatus 1004 may include a voice playing device, a display device, an auxiliary lighting apparatus (e.g., an LED), a haptic feedback apparatus (e.g., a vibration motor), and the like. The display device may include, but is not limited to, a liquid crystal display (LCD), a light-emitting diode (LED) display, and a plasma display. In some implementations, the display device may be a touch screen.

Various implementations of the systems and technologies described herein may be implemented in a digital electronic circuit system, an integrated circuit system, an application-specific ASIC (application-specific integrated circuit), computer hardware, firmware, software, and/or combination thereof. These various implementations may include implemented in one or more computer programs, the one or more computer programs are executed and/or interpreted on a programmable system including at least one programmable processor, the programmable processor may be a dedicated purpose or general-purpose programmable processor that may receive data and instructions from a storage system, at least one input device, and at least one output device, and transmit data and instructions to the storage system, at least one input apparatus, and at least one output apparatus.

These computing programs (also called known as, software, software applications, or codes) include machine instructions of a programmable processor, and can be implemented using high-level procedures and/or object-oriented programming languages, and/or assembly/machine languages. As used herein, the terms "machine-readable medium" and "computer-readable medium" refer to any computer program product, device, and/or apparatus used to provide machine instructions and/or data to a programmable processor (e.g., magnetic disk, optical magnetic disk, memory, programmable logic device (PLD)), including machine-readable medium that receive machine instructions as machine-readable signals. The term "machine-readable signal" refers to any signal used to provide machine instructions and/or data to a programmable processor.

To provide interaction with the user, the systems and technologies described herein can be implemented on a computer having: a display apparatus (e.g., a CRT (cathode ray tube) or LCD (liquid crystal display) monitor) for displaying information to the user; and a keyboard and pointing device (e.g., a mouse or a trackball) through which the user can provide input to the computer. Other kinds of apparatuses may also be used to provide interaction with a user; for example, the feedback provided to the user may be any form of sensor feedback (for example, visual feedback, audible feedback, or haptic feedback); and may receive input from the user in any form, including acoustic input, voice input or haptic input.

The systems and technologies described herein can be implemented in a computing system including background components (e.g., as a data server), or a computing system including middleware components (e.g., an application server), or a computing system including front-end components (e.g., a user computer with a graphical user interface or a web browser through which users can interact with implementation of the systems and technologies described herein), or a computing system that includes any combination of such back-end components, middleware components, or front-end components. The components of the systems can be interconnected by any form or medium of digital data communication of digital data communication (e.g., a communication network). Examples of communication networks include local area network (LAN), wide area network (WAN), and Internet.

The computer system may include a client and a server. The client and server are generally remote from each other and typically interact through a communication network. The relationship between the client and server is generated by computer programs running on a corresponding computer and having a client-server relationship with each other.

It should be understood that steps can be reordered, added or deleted using various forms of processes shown above. For example, the steps recorded in the present application can be executed in parallel, sequentially or in a different order. So long as the desired result of the technical solution disclosed in the present application can be achieved, no limitation is made herein.

The above-mentioned specific implementations do not constitute a limitation of the protection scope of the present application. It should be understood by those skilled in the art that various modifications, combinations, sub-combinations and substitutions may be made according to design requirements and other factors. Any modification, equivalent replacement, improvement and the like made within the spirit and principle of the present application shall be included in the protection scope of the present application.

What is claimed is:

1. A magnetic disk management method, wherein the magnetic disk management method is applicable to a distributed storage architecture based on a shingled magnetic disk, the distributed storage architecture of the shingled magnetic disk comprises: an engine layer, an encapsulation layer and a magnetic disk layer;

wherein the engine layer stores a plurality of space files, and each space file is independent; the encapsulation layer stores a file directory tree for representing a space file structure indicative of relationships between the plurality of space files; and the magnetic disk layer comprises a plurality of magnetic disk spaces, and the plurality of space files have a one-to-one correspondence to the plurality of magnetic disk spaces;

the magnetic disk management method comprises:

responding to a data management operation to be performed for a target space file of the file directory tree output by the engine layer, and determining a file address of the target space file through space file index items in the engine layer;

transparently transmitting, through the engine layer, the data management operation and the file address of the target space file to the encapsulation layer;

determining a space address of a target magnetic disk space corresponding to the file address of the target space file through an address association list in the encapsulation layer; wherein the address association list comprises an address corresponding relationship between each space file and a corresponding magnetic disk space thereof; and performing data management on data in the target magnetic disk space through the space address of the target magnetic disk space determined by the encapsulation layer.

2. The magnetic disk management method according to claim 1, further comprising:

responding to a space file management operation triggered on the file directory tree output by the engine layer, managing, through the engine layer, the stored plurality of the space files, and transparently transmitting the space file management operation to the encapsulation layer;

processing, through the encapsulation layer, an association relationship between a space file in the engine layer and a magnetic disk space in the magnetic disk layer; and updating, through the encapsulation layer, the file directory tree using a processing result, and outputting, through the engine layer, an updated file directory tree.

3. The magnetic disk management method according to claim 2, wherein the space file management operation is a space file creating operation;

the managing, through the engine layer, the stored plurality of the space file comprises:

creating a new space file through the engine layer;

the processing, through the encapsulation layer, the association relationship between the space file in the engine layer and the magnetic disk space in the magnetic disk layer, comprises:

determining, through the encapsulation layer, any free magnetic disk space in the magnetic disk layer, and associating and storing a space address of the new space file and a space address of the free magnetic disk space in the address association list, such that data written into the new space file is stored in the free magnetic disk space corresponding to the new space file through the address association list.

4. The magnetic disk management method according to claim 3, wherein the updating, through the encapsulation layer, the file directory tree using the processing result, and outputting, through the engine layer, the updated file directory tree comprises:

adding, through the encapsulation layer, a file identifier of the new space file into the file directory tree to obtain the updated file directory tree, and outputting, through the engine layer, the updated file directory tree.

5. The magnetic disk management method according to claim 2, wherein the space file management operation is a space file deleting operation;

the managing, through the engine layer, the stored plurality of the space files comprises:

deleting, through the engine layer, a space file to be deleted that is selected by the space file deleting operation;

the processing, through the encapsulation layer, the association relationship between the space file in the engine layer and the magnetic disk space in the magnetic disk layer comprises:

determining a magnetic disk space to be deleted corresponding to the space file to be deleted through the address association list in the encapsulation layer, deleting data in the magnetic disk space to be deleted, and releasing an address corresponding relationship between the magnetic disk space to be deleted and the space file to be deleted in the address association list.

6. The magnetic disk management method according to claim 5, wherein the updating, through the encapsulation layer, the file directory tree using the processing result, and outputting, through the engine layer, the updated file directory tree comprises:

deleting, through the encapsulation layer in the file directory tree, a file identifier of the space file to be deleted that is selected by the space file deleting operation to obtain the updated file directory tree, and outputting, through the engine layer, the updated file directory tree.

7. The magnetic disk management method according to claim 2, wherein the space file management operation is a space file rewriting operation;

the managing, through the engine layer, the stored plurality of the space files comprises:

acquiring, through the engine layer, a hole rate and a creation time of each space file, and determining a space file to be rewritten; wherein the hole rate of the space file to be rewritten is greater than a hole rate threshold, and a duration corresponding to the creation time is greater than a duration threshold; and performing, through the engine layer, rewriting processing on the space file to be rewritten.

8. The magnetic disk management method according to claim 7, wherein the performing, through the engine layer, rewriting processing on the space file to be rewritten comprises:

recombining, through the engine layer, space files to be rewritten to obtain a rewritten space file; and determining, through the engine layer, a rewriting position of the rewritten space file, and releasing physical spaces of the space files to be rewritten; wherein the rewriting position is an end of a rewritten space file obtained by a previous rewriting processing.

9. The magnetic disk management method according to claim 1, further comprising:

responding to a statistical operation transparently transmitted to the encapsulation layer through the engine layer; and outputting, through the engine layer, magnetic disk space usage information of the magnetic disk layer pre-stored in the encapsulation layer.

10. The magnetic disk management method according to claim 9, wherein the magnetic disk space usage information comprises a free magnetic disk space list, a magnetic disk capacity of a free magnetic disk space and a total capacity of magnetic disk spaces of the magnetic disk layer.

11. The magnetic disk management method according to claim 1, wherein a capacity of a magnetic disk space is consistent with that of a space file.

12. The magnetic disk management method according to claim 1, wherein the data management operation comprises data reading and storing, data migrating and data deleting.

13. A magnetic disk management apparatus, wherein the magnetic disk management apparatus is applicable to a distributed storage architecture of a shingled magnetic disk, and comprises: an engine layer, an encapsulation layer and a magnetic disk layer;

wherein the engine layer stores a plurality of space files, wherein each space file is independent; the encapsulation layer stores a file directory tree for representing a space file structure indicative of relationships between the plurality of space files; and the magnetic disk layer comprises a plurality of magnetic disk spaces, and the plurality of space files have a one-to-one correspondence to the plurality of magnetic disk spaces;

the engine layer is configured to respond to a data management operation to be performed for a target space file of the file directory tree displayed by the engine layer, and determine a file address of the target space file using space file index items in the engine layer; and further configured to transparently transmit the data management operation and the file address of the target space file to the encapsulation layer; and the encapsulation layer is configured to: determine a space address of a target magnetic disk space corresponding to the file address of the target space file according to an address association list, wherein the address association list comprises an address corresponding relationship between each space file and a corresponding magnetic disk space thereof; and perform data management on data in the target magnetic disk space according to the space address of the target magnetic disk space.

14. The magnetic disk management apparatus according to claim 13, wherein, the engine layer is further configured to display the file directory tree and manage the plurality of space files stored thereon according to a space file management operation triggered on the file directory tree;

the encapsulation layer is further configured to process an association relationship between a space file in the engine layer and a magnetic disk space in the magnetic disk layer according to the space file management operation, update the file directory tree according to a processing result, and displaying an updated file directory tree through the engine layer.

15. The magnetic disk management apparatus according to claim 14, wherein the space file management operation is a space file creating operation;

the engine layer is configured to create a new space file according to the space file creating operation; and the encapsulation layer is configured to determine any free magnetic disk space in the magnetic disk layer, and associate and store a space address of the new space file and a space address of the free magnetic disk space in the address association list, such that data written into the new space file is stored in the free magnetic disk space corresponding to the new space file through the address association list.

16. The magnetic disk management apparatus according to claim 15, wherein the space file management operation is a space file deleting operation;

the engine layer is configured to delete a space file to be deleted that is selected by the space file deleting operation; and the encapsulation layer is configured to determine a magnetic disk space to be deleted corresponding to the space file to be deleted according to the address association list, delete data in the magnetic disk space to be deleted, and release an address corresponding relationship between the magnetic disk space to be deleted and the space file to be deleted in the address association list.

17. The magnetic disk management apparatus according to claim 14, wherein the space file management operation is a space file rewriting operation;

the engine layer is configured to: acquire a hole rate and a creation time of each space file, and determine a space file to be rewritten, wherein the hole rate of the space file to be rewritten is greater than a hole rate threshold, and a duration corresponding to the creation time is greater than a duration threshold; and perform rewriting processing on the space file to be rewritten.

18. The magnetic disk management apparatus according to claim 14, wherein the encapsulation layer is further configured to respond to a statistical operation transparently transmitted to the encapsulation layer through the engine layer; and the engine layer is further configured to display magnetic disk space usage information of the magnetic disk layer pre-stored in the encapsulation layer.

19. An electronic device, comprising:
at least one processor; and
a memory communicatively connected to the at least one processor; wherein
the memory stores instructions executable by the at least one processor, the instructions being executed by the at least one processor to enable the at least one processor to execute the method according to claim 1.

20. An electronic device, comprising:
at least one processor; and
a memory communicatively connected to the at least one processor; wherein
the memory stores instructions executable by the at least one processor, the instructions being executed by the at least one processor to enable the at least one processor to execute the method according to claim 2.

* * * * *